US011860904B2

(12) United States Patent
Suhre et al.

(10) Patent No.: US 11,860,904 B2
(45) Date of Patent: Jan. 2, 2024

(54) DETERMINING AND PROPAGATING HIGH LEVEL CLASSIFICATIONS

(71) Applicant: International Business Machines Corporation, Armonk, NY (US)

(72) Inventors: Oliver Suhre, Stuttgart (DE); Albert Maier, Tuebingen (DE); Peter Gerstl, Holzgerlingen (DE); Thomas Schwarz, Stuttgart (DE); Michael Baessler, Bempflingen (DE)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 17/108,554

(22) Filed: Dec. 1, 2020

(65) Prior Publication Data
US 2022/0171793 A1   Jun. 2, 2022

(51) Int. Cl.
*G06F 16/00* (2019.01)
*G06F 16/28* (2019.01)

(52) U.S. Cl.
CPC .................. *G06F 16/285* (2019.01)

(58) Field of Classification Search
CPC .......... G06F 16/71; G06F 16/20; G06F 16/21; G06F 16/284; G06F 16/951; G06F 3/0481; G06F 3/0484; G06F 7/00; G06F 16/26; G06F 16/2423; G06F 16/252; G06F 8/456; G06F 8/76; G06V 10/422; G06V 20/40; G06V 30/10; G06V 30/162; G06V 30/413; G06V 10/424; G06T 2207/10024; G06T 2207/30176; G06T 7/11

See application file for complete search history.

(56) References Cited

U.S. PATENT DOCUMENTS

| | | | | |
|---|---|---|---|---|
| 6,922,696 B1* | 7/2005 | Lincoln | ................. | G06F 21/556 707/999.102 |
| 7,254,285 B1* | 8/2007 | Paek | .................... | G06V 10/424 358/453 |
| 7,318,066 B2* | 1/2008 | Kaufman | ............... | G06F 16/26 707/999.005 |
| 2005/0289342 A1 | 12/2005 | Needham | | |

(Continued)

OTHER PUBLICATIONS

"DgDiscover™—Identification and Location of Sensitive Enterprise Data", 2 pps, downloaded form the Internet on Nov. 21, 2020, <https://www.dataguise.com/pdf/DgDiscover_datasheet.pdf>.

(Continued)

*Primary Examiner* — Shyue Jiunn Hwa
(74) *Attorney, Agent, or Firm* — Stephen R. Yoder

(57) ABSTRACT

Aspects of the present invention disclose a method, computer program product, and system for governing a set of information assets using an information governance system. The method includes one or more processors applying one or more high-level classification assignment rules to one or more information assets of the set of information assets. Furthermore, the method includes one or more processors applying one or more high-level classification propagation rules to the one or more information assets provided with the high-level classification assignments for propagating the respective high-level classification assignments upwards within a containment hierarchy formed by the set of information assets to one or more superordinate information assets of the set of information assets.

19 Claims, 7 Drawing Sheets

(56) References Cited

U.S. PATENT DOCUMENTS

2008/0046462 A1* 2/2008 Kaufman ............ G06F 16/2423
707/999.102
2017/0091680 A1 3/2017 Rosenthal

OTHER PUBLICATIONS

"Using Transparent Sensitive Data Protection", Oracle, 35 pps., Copyright @ 2006, 2017, <https://docs.oracle.com/database/121/DBSEG/tsdp.htm#DBSEG855>.

Ferguson, "Organising the Data Lake the Central Role of an Information Catalog", White Paper, Copyright @ Intelligent Business Strategies Limited, 2017, All Rights Reserved, 21 pps., <https://go.waterlinedata.com/hubfs/a/Waterline-Data-Organising-the-Data-Lake.pdf>.

Gupta, "SQL data classification—Add sensitivity classification in SQL Server 2019", Oct. 31, 2018, SQLShack, 11 pps., <https://www.sqlshack.com/sql-data-classification-add-sensitivity-classification-in-sql-server-2019/>.

"Patents Act 1977: Examination Report under Section 18(3)", Your Reference: DP/P49992GB, Application No: B2116487_6, dated Aug. 8, 2022, 4 pages.

"Reply to Exam Report", UK Patent Application No. 2116487.6, dated Oct. 10, 2022, 3 pages.

"Reply to Exam Report", UK Patent Application No. 2116487.6, dated Jun. 8, 2022, 3 pp.

"Patents Act 1977: Combined Search Report under Section 17(5)(b) and Abbreviated Examination Report under Section 18(3)", Your Reference: DP/P49992GB, Application No: GB2116487.6, dated May 12, 2022, 7 pages.

"Database Security Guide", Oracle Help Center, Copyright @ 2006, 2017, Oracle, 35 pages.

"DgDiscover™—Identification and Location of Sensitive Enterprise Data", Dataguise Inc., Fremont, CA, printed on Jun. 9, 2023, 2 pages.

Ferguson, Mike, "Organising The Data Lake, The Central Role of An Information Catalog", White Paper, Apr. 2017, 21 pages.

Gupta, Rajendra, "SQL data classification—Add sensitivity classification in SQL Server 2019", SQLShack, Oct. 31, 2018, 11 pages.

* cited by examiner

DETERMINING AND PROPAGATING HIGH LEVEL CLASSIFICATIONS

BACKGROUND OF THE INVENTION

The present invention relates generally to the field of electronic data governance, and more particularly to governing a set of information assets.

Information governance provides solutions for managing information, in particular large amounts of data. Thereby, a risk that information presents is balanced with a value that information provides. A consistent and logical framework is required for handling electronically stored information to ensure this kind of balance using (e.g., information governance policies and procedures). The policies guide proper behavior regarding how organizations and employees handle electronically stored information. The information managed may comprise a plurality of different information assets. Such information assets may comprise each other resulting in different and possibly interdependent requirements regarding their handling. In order to enable a suitable governing, the information assets may have to be properly classified, which may turn out to be challenging.

SUMMARY

Various embodiments provide a method for governing a set of information assets using an information governance system as well as a computer program product and a computer system for executing the method as described by the subject matter of the independent claims. Advantageous embodiments are described in the dependent claims. Embodiments of the present invention can be freely combined with each other if they are not mutually exclusive.

Aspects of the present invention disclose a method, computer program product, and system for governing a set of information assets. The method includes one or more processors identifying a set of information assets being an at least partially ordered set forming a first containment hierarchy. The information assets are provided with information asset type identifiers and at least some of the information assets being provided with low-level classification assignments to low-level classes. The method further includes one or more processors determining a set of high-level classes. The method further includes one or more processors determining a set of high-level classification assignment rules for assigning the information assets of the set of information assets to the high-level classes of the set of high-level classes using the information asset type identifiers and the low-level classification assignments of the respective information assets. The method further includes one or more processors determining a set of one or more high-level classification propagation rules for propagating the high-level classification assignments of one or more information assets of the set of information assets, which are subordinate to one or more superordinate information assets of the set of information assets, to the one or more superordinate information assets. The method further includes one or more processors applying one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the high-level classes of the set of high-level classes as output.

In another embodiment, the method further includes one or more processors applying one or more high-level classification propagation rules of the set of high-level classification assignment rules to the one or more information assets of the set of information assets provided with the high-level classification assignments for propagating the respective high-level classification assignments upwards within the first containment hierarchy to one or more superordinate information assets of the set of information assets.

In an example embodiment, the set of high-level classes is an at least partially ordered set of high-level classes with at least some of the high-level classes comprising a hierarchical relationship to each other. In another example embodiment, the partially ordered set of high-level classes forms a complete lattice with each subset of the set having a supremum. In another example embodiment, the providing of the set of high-level classification propagation rules comprises using an ordering of the high-level classes within the complete lattice for determining one or more high-level classification propagation rules of the set of high-level classification propagation rules.

BRIEF DESCRIPTION OF THE DRAWINGS

In the following, embodiments of the invention are explained in greater detail, by way of example only, making reference to the drawings.

DETAILED DESCRIPTION

Figure 1:
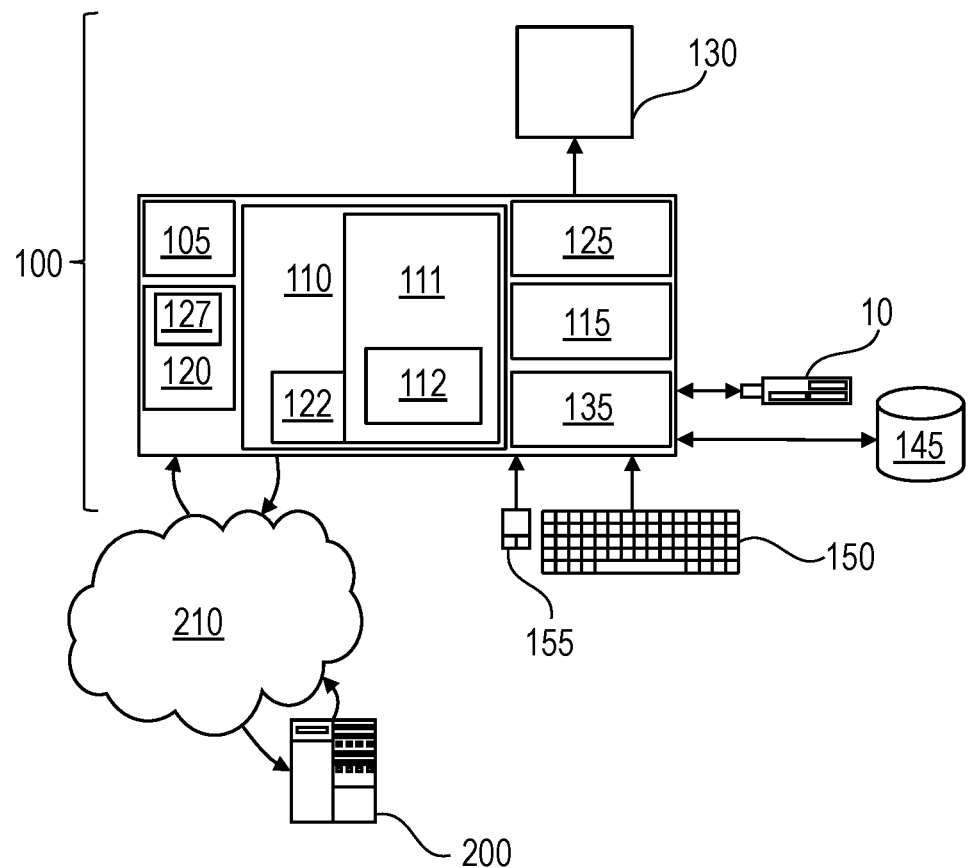
FIG. 1 depicts a schematic diagram illustrating an exemplary computer system, in accordance with embodiments of the present invention.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing an efficient method for assigning and propagating High-Level Classifications (HLC) assignments in a set of information assets. Thereby, an efficient and effective approach for assigning information assets to high-level classes may be implemented. Based on high-level classification assignments provided by applying the high-level classification assignment rules, embodiments of the present invention can provide high-level classification assignments to superordinate information assets. For this purpose, embodiments of the present invention can propagate high-level classification assignments provided using the high-level classification assignment rules upwards within the first containment hierarchy to superordinate information assets using the high-level classification propagation rules. For example, the set of information assets may be provided in form of a governed data lake. The assigning and propagating of HLC assignments may be implemented using an automatic approach.

The term information asset refers to a set of data (i.e., a dataset) comprising information. Datasets may be organized according to a hierarchical structure (e.g., a containment hierarchy). The datasets may be used to organize data (e.g., data of a data lake). A dataset of a higher hierarchical level of the hierarchical structure may comprise datasets of a lower hierarchical level. Thus, an information asset of a higher hierarchical level (i.e., a superordinate information asset) may comprise information assets of a lower hierarchical level (i.e., subordinate information assets).

A low-level class may be defined for classifying information assets of low hierarchical levels of the containment hierarchy of the set of information assets (e.g., information assets of the lowest hierarchical level). High-level classes may be used for classifying information assets of all hierarchical levels of the containment hierarchy of the set of information assets. In particular, high-level classes may be used for also classifying information assets of high hierarchical levels of the containment hierarchy of the set of information assets.

For example, Low-level classes can define specific characteristics of the information comprised by an information asset. In further examples, High-level classes can define abstract characteristics of the information comprised by an information asset. At least some of the information assets of the set of information assets may be provided with low-level classification assignments. For example, information assets at a lowest hierarchical level of the containment hierarchy of the set information assets may be provided with low-level classification assignments. In various examples, low-level classification assignments to low-level classes can be assigned manually, semi-automatically, or fully automatically.

Low-level classes may be described by low-level notions. For example, the low-level notions may include notions like "customer data" or "reference data." In additional examples, the low-level notions describing the low-level classes can comprise so-called business terms. For managing low-level notions of a set of low-level classes, a glossary may be provided.

In example embodiments, the HLC may use classes defined by or being based on definitions provided by regulations and laws (e.g., the Foreign Account Tax Compliance Act (FATCA), the Payment Card Industry Data Security Standard (PCI Compliance), the Health Insurance Portability and Accountability Act (HIPAA), the Financial Services Modernization Act of 1999 (GLBA), the Sarbanes-Oxley Act of 2002 (SOX), the Federal Rules of Civil Procedure, the General Data Protection Regulation (GDPR), or the California Consumer Privacy Act (CCPA)), etc. Thus, using HLC the information governance system may be configured to govern the information assets in compliance with those regulations and laws.

For example, a regulation like GDPR may require a HLC taking into account classes like "Personally Identifiable Information" ("PII") or "Sensitive Information" ("SI"). For those differentiations, embodiments of the present invention recognize that low-level classifications may not be suited. In particular, since terms of low-level classes may often be subject to changes. Even if low-level classes are organized in some sort of hierarchy or categories, there is often no single point in such a hierarchy which denotes a or may be associated with a high-level class of an HLC. For example, low-level classes may rather be orthogonal to each other (i.e., two different low-level classes may each be associated with a different high-level class, with the respective two different high-level classes not being subclasses of a common high-level class).

Moreover, a HLC assignment may be required to be propagated from fine granular information assets (i.e., subordinate information assets, such as data fields or columns), to coarse granular information assets (i.e., superordinated information assets, such as tables, schemas or databases). For instance, in the case of PII, if a subordinate information asset (e.g., a column) comprises personally identifiable information and is assigned to the high-level class PII, then a superordinate information asset (e.g., a table comprising the respective column) also contains personally identifiable information and may have to be assigned to the high-level class PII as well. This kind of information may be important in order to comply with regulations, like GDPR or similar regulations and laws.

Embodiments of the present approach may enable a propagation even in non-trivial cases, where a HLC assignment of a superordinate information asset (e.g., a table), is not automatically the combination of all HLCs assignments of subordinate information assets comprised by the respective superordinate information asset (e.g., such as the columns of the respective table).

For example, high-level classes may comprise the aforementioned class of "Personally Identifiable Information" (PII) as well as classes like "Personally Identifiable Information in Public Domain" (PIIPD) (i.e., personally identifiable information that can be inferred from publicly available sources), "Sensitive Personally Identifiable Information" (SPII), and "Highly Sensitive Personally Identifiable Information" (HSPII). For example, a first column of a table may comprise personally identifiable information in public domain and be assigned with the HLC PIIDP. A second column of the table may comprise highly sensitive personally identifiable information and be assigned with the HLC HSPII. The table comprising the two aforementioned columns may have to be assigned with the HLC HSPII not PIIPD.

Propagating HLCs upward may be a customized (e.g., user-defined) function that maps one or more HLC assignments of one or more information assets on a lower hierarchical level (e.g., columns) to one or more HLC assignments of an information asset on a higher hierarchical level (e.g., a table).

For example, HLC assignments of subordinate information assets may result in a HLC assignment of a superordinate information asset that differs from the HLC assignments of subordinate information assets. For example, a first column A may be assigned a HLC assignment PIIPD, while a second column B may be assigned a HLC assignment SPII. A table comprising the two columns A and B may be assigned HLC assignment HSPII, because it may only be possible to uniquely identify a person using a combination of information in columns A and B.

The method for governing a set of information assets described herein may introduce new concepts into the information governance system. A notion of high-level classes such as PII, PIIPD, SPII, HSPII may be introduced enabling HLCs. Furthermore, a mechanism of extensible rules (e.g., extensible automation rules) that runs at classification time and generates HLCs from low-level class assignments (e.g., from business term assignments and other information). The mechanisms of extensible rules may further be configured to propagate HLC assignments from fine granular information assets (e.g., a column) to a coarser granular information asset comprising the respective fine granular information assets (e.g., a table or database comprising the respective column). Thus, in some examples HLC assignments may be adapted automatically to deletions of information assets. In other examples, HLC assignments can be adapted automatically to an amendment of a low-level class assignment. For example, data comprised by an information asset may be amended, replaced or additional data may be added resulting in an amended low-level class assignment of the respective information asset. For example, in an information asset (e.g., a column) data of a different syntactic or semantic type may be inserted. Thus, the low-level class assignment of the respective information asset and, in consequence, the HLC assignment of the respective information asset may have to be amended as well.

In various example embodiments, the set of information assets may be used to govern a data lake. For example, the information governance system for governing the set of information assets may be configured to provide the following characteristics and functionality.

A meta data store may be provided comprising all the information assets of the set of information assets (e.g., identifiers of all the information assets). For example, the set of information assets may include all the information assets of an enterprise. Each information asset is assigned with an information asset type identifier identifying the information asset type of the respective information asset (e.g., column, table, column, file, etc.). The information assets are organized in a containment hierarchy (i.e., the set of information assets is an at least partially ordered set forming a containment hierarchy). For instance, a relational database may comprise schemas which comprise tables which comprise columns.

In example embodiments, the information governance system may further comprise a glossary, such as a hierarchical glossary, of low-level classes to manage low-level classes and assigning information assets with low-level classification to the low-level classes. The glossary may define a set of low-level classes. The low-level classes may describe syntactic properties of information comprised by an information asset (e.g., names, addresses, postal codes, email addresses, phone numbers, credit card numbers, airport codes, etc.). The low-level classes may describe semantic properties of information comprised by an information asset (e.g., a business term defining business relevant properties of the respective information asset). For example, the glossary may be a business glossary.

The information governance system may be configured for performing a data analysis of the data comprised by the information assets of the set of information assets. For example, the data may be analyzed through a pipeline of algorithms that perform a low-level classification of information assets. The low-level classification may comprise reading and classifying data and/or metadata of the respective information assets. The information assets may be assigned with low-level assignments to low-level classes defined by syntactic and/or semantic definition or terms provided by the glossary.

The information governance system may comprise automation rules. The automation rules may define a condition under which they are executed and an action which is performed by execution the respective rules. For example, information governance system may take care that the action defined by an automation rule is executed whenever the condition defined by the respective automation rule is met. For instance, an automation rule may define: if an information asset of the information type column is assigned to the class X, then in addition assign the information asset to the class Y. For example, class X may be defined by a syntactic definition, while class Y may be defined by a semantic definition provided by the glossary.

The concept of HLCs as a first-class concept in an information governance system may be introduced. For example, default HLC notions (e.g., the aforementioned PII and SPII) may be provided. Additionally, or alternatively, customized (e.g., also user-defined) additional high-level classes may be provided for HLCs. For example, the HLCs may be hierarchical. For example, PII might have children PIIPD, SPII and/or HSPII, which may be more restrictive than PII.

The HLC assignment rules may define how HLCs are created from low-level classifications and HLCs are assigned based on the low-level classifications (e.g., such as basic data classifications and/or term assignments). For example, a HLC assignment rule may use an information asset type together with one or more the low-level classifications as input and produces a list of one or more HLC assignments to one or more high-level classes as output. For example, HLC assignment rules may be applied after low-level classifications have been performed either manually or using an automated process. The HLC assignment rule may be of any formalism. For example, the rules may be provided using a simple, Java-script like programming language. For example, a HLC assignment rule may have a form similar to "if a column is assigned to the low-level classes 'PersonName' and 'Customer', then the column is to be assigned to the high-level class 'PII'."

The HLC propagation rules may define how existing HLC assignments of information assets are propagated upward (i.e., to one or more superordinate information asset that contain the information asset in question). For instance, a column may be contained by a table which is, in turn, contained by a schema, which again is, in turn, contained by a database etc. A HLC propagation rule may use an information asset type and one or more HLC assignments of a subordinate information asset as an input and provide one or more HLC assignments of one or more superordinate information assets as an output.

The HLC assignments according to the HLC propagation rules may be applied to information assets of superordinate information asset types that comprise the subordinate information asset type of the information asset provided as input to the respective HLC propagation rule. In other words, a propagation rule may define how HLC assignments propagate one level up in a containment hierarchy of the information assets. For example, HLC propagation rules may be applied after the HLC assignment rules have been applied or after a user has assigned or amended a HLC assignment to an information asset manually. As above, HLC propagation rules may be provided using a simple, Java-script like programming language. For example, a HLC propagation rule may have a form similar to "if there are one or more information assets of information asset type 'column' and assigned to the high-level classes 'PII' and 'SPII', then a superordinate information asset of information asset type 'table' containing the respective one or more information assets of information asset type 'column' has to be assigned to the high-level class 'HSPII'."

For example, the HLC assignment rules and HLC propagation rules may be applied every time an information asset is classified to a low-level class, either through an automated analysis or manually by a user. For example, the HLC assignment rules and HLC propagation rules may be applied every time a low-level class is deleted or modified.

For example, the applying of the one or more high-level classification propagation rules may be performed recursively hierarchical level by hierarchical level upwards through the first containment hierarchy. The application process may have the beneficial effect of successively assigning each information asset of the set of information assets to a high-level class. A HLC assignment of a superordinate information asset may depend on HLC assignments of subordinate information assets comprised by the superordinate information asset according to the containment hierarchy. Thus, the HLC assignments of superordinate information asset may be equally restrictive or more restrictive than the HLC assignments of the respective subordinate information assets.

For example, the HLC assignment rules and the HLC propagation rules may be applied recursively from bottom to top of the containment hierarchy of the set of information assets. For instance, if a low-level class is deleted, all information assets assigned to the respective low-level class are determined, the HLC assignment rules are applied (again) and the HLC propagation rules are applied to the respective information assets as well as to all siblings (i.e., to all the information assets on the same hierarchical level).

For example, the applying of the one or more high-level classification propagation rules may start with the one or more information assets of the set of information assets provided with the high-level classification assignments and may end with an upper most superordinate information asset at the top of the first containment hierarchy. The process may have the beneficial effect of that HLC assignment rules may be applied to information assets thorough the containment hierarchy.

For example, each information asset may be provided with a HLC assignment. For example, low-level classifications assignments may only be applied to information assets assigned to particular hierarchical levels of the containment hierarchy (i.e., assigned with information assets type identifiers of the respective hierarchical levels of the containment hierarchy). For example, low-level classifications assignments may only be applied to information assets at the bottom of the containment hierarchy (e.g., to the lowest level or the lowest levels of the containment hierarchy). HLC assignment rules may only be applied to information asset assigned with a low-level classification assignment in order to assign the respective information assets with HLC assignments. Thus, HLC propagation rules may be used to assign all the remaining information assets assigned to higher hierarchical levels of the containment hierarchy (i.e., assigned with information assets type identifiers of the respective higher hierarchical levels of the containment hierarchy) with HLC assignments.

For example, the applying of the one or more high-level propagation rules may comprise applying the one or more high-level propagation rules to all information assets of the set of information assets that are at a same hierarchical level within the first containment hierarchy and share a common superordinate information asset of the set of information assets. The process may have the beneficial effect of taking into account the HLC assignments of all the subordinate information asset comprised by a superordinate information asset, when propagating the HLC assignments upwards to the respective superordinate information asset.

For example, the set of high-level classes may comprise one or more default high-level classes, which may have the beneficial effect of providing standardized high-level classes defined for satisfying particular requirements (e.g., defined by common regulations or necessities). For example, the providing of the set of high-level classes may comprise receiving one or more customized high-level classes, which may have the beneficial effect of providing individual high-level classes defined for a particular individual purpose.

For example, the set of high-level classification assignment rules may comprise one or more default high-level classification assignment rules, which may have the beneficial effect of providing standardized high-level classification assignment rules defined for satisfying particular requirements (e.g., defined by common regulations or necessities).

For example, the providing of the set of high-level classification assignment rules may comprise receiving one or more customized high-level classification assignment rules, which may have the beneficial effect of providing individual high-level classification assignment rules defined for a particular individual purpose.

For example, the set of high-level classes may be an at least partially ordered set of high-level classes with at least some of the high-level classes comprising a hierarchical relationship to each other, which may have the beneficial effect that the hierarchical relationship may be used to determine HLC propagation rules (e.g., automatically). For example, a high-level class being superordinate to one or more subordinate high-level class according to the hierarchical relationship may be more restrictive than the one or more subordinate high-level classes. Thus, a combination of two or more subordinate high-level classes may result in a superordinate high-level class at a next higher level of the hierarchical relationship. In case different subordinate information assets comprised by a superordinate information asset are assigned to two or more high-level class at the same hierarchical level within the set of high-level classes, the superordinate information asset may be assigned to a superordinate high-level class at a next higher level of the hierarchical relationship above the aforementioned two or more high-level class at the same hierarchical level.

For example, the at least partially ordered set of high-level classes may form a second containment hierarchy, which may have the beneficial effect of that all the high-level classes may be part of the containment hierarchy and HLC propagation rules may be determined using the second containment hierarchy. For example, if different subordinate information assets comprised by a superordinate information asset are assigned to two or more high-level class at the same hierarchical level of the second containment hierarchy, then the superordinate information asset may be assigned to a superordinate high-level class at a next higher level of second containment hierarchy above the aforementioned two or more high-level class at the same hierarchical level. In case all the high-level classes of the set of high-level classes are comprise by the second containment hierarchy, assignment propagation rules taking into account all the high-level classes of the second containment hierarchy may be determined using the hierarchical structure of the second containment hierarchy.

For example, the providing of the set of high-level classification propagation rules may comprise determining one or more high-level classification assignment rules using an analysis of the second containment hierarchy. The process may have the beneficial effect that high-level classification propagation rules may be determined automatically using the second containment hierarchy.

For example, the partially ordered set of high-level classes may form a lattice. For example, the partially ordered set of high-level classes may form a complete lattice with each subset of the set having a supremum. Consider a superordinate information asset comprising a set of subordinate information assets, which are assigned to a subset of high-level classes of the set of high-level classes comprised by the lattice structure. A HLC propagation rule may be determined which defines that the superordinate information asset is assigned to a high-level class of the set of high-level classes which is the supremum of the subset of high-level classes. Thus, by identifying suprema for different subsets of high-level classes HLC propagation rules for propagating HLC assignments may be identified.

A lattice is a partially ordered set with each subset of the set having a least upper bound, also referred to as a supremum. In the present context, for example, if there is a subset S of a lattice with high-level classes, then there is always one high-level class (which is not necessarily a member of S) that is the most restrictive high-level class. For instance, the supremum of the high-level classes PII and HSPII may be HSPII. For instance, the supremum of the high-level classes PII and SPII may be HSPII. In the latter case, the supremum of two high-level classes is a different high-level class than the original two high-level classes. If there is such a structure, then HLC propagation rules may be inferred automatically, in that the high-level class of a table, say, is the supremum of the high-level classes of columns comprised by the respective table. Moreover, the high-level class of a superordinate information asset may be the supremum of all high-level classes of all subordinate information assets comprised by the respective superordinate information asset. Thus, HLC propagation rules may not need to be recursively called, but rather a single supremum identification operation may suffice. Thus, providing and/or applying HLC propagation rules determined based on a lattice structure of high-level classes may be much more efficient. For example, embodiments of the present invention can utilize customized (e.g., user-defined) HLC propagation rules and/or HLC propagation rules determined (e.g., automatically) using a lattice structure of the high-level classifications.

For example, the providing of the set of high-level classification propagation rules may comprise using an ordering of the high-level classes within the lattice (e.g., complete lattice) for determining one or more high-level classification propagation rules of the set of high-level classification propagation rules. The process may have the beneficial effect that a supremum may be used for determining the high-level propagation rules. The high-level propagation rules may define that a superordinate information asset is provided with a high-level classification assignment to a high-level class of the set of high-level classes that is the supremum of the subset of high-level classes to which information assets comprised by the superordinate information asset are assigned. For example, an automated determining of HLC propagation rules may be enabled. For example, for each combination of high-level classes to which subordinated information assets comprised by a common superordinated information asset are assigned, a supremum may be determined. The HLC propagation rules may define to assign the respective common superordinated information asset to the high-level class being the supremum of the combination of high-level classes to which the subordinate information assets are assigned.

For example, the high-level classification propagation rules may be applied to a plurality of information assets of different hierarchical levels using a single supremum-based operation. The process may have the beneficial effect that determining suprema may be used to determine propagations of HLC assignments within the first containment hierarchy of set of information assets to arbitrary hierarchical levels of the containment hierarchy directly.

For example, the set of high-level classification propagation rules may comprise receiving one or more user-defined high-level classification assignment rules. Thus, embodiments of the present invention can provide customized high-level classification assignment rules that are optimized for the need of a particular usage.

For example, embodiments of the present invention can perform the applying of the one or more high-level classification assignment rules and the applying of the one or more high-level classification propagation rules upon detecting a triggering event. For example, the triggering event may be one of the following: adding an information asset to the set of information assets, amending an information asset of the set of information assets, deleting an information asset from the set of information assets.

For example, amending an information asset may comprise amending a content of the information asset, amending a low-level classification assignment of the information asset.

For example, amending a low-level classification assignment may comprise adding an additional low-level classification assignment, deleting a low-level classification assignment, amending a low-level class of a low-level classification assignment.

For example, amending definition of low-level classes and/or high-level classes may require immediate action to re-classify all impacted information assets to assure that classifications, in particular HLCs, are always up-to-date.

For example, processing of the information assets may be restricted based high-level classification assignments of the respective information assets. The processing can include one or more of the following: storing, archiving, deleting, and accessing. The processing may have the beneficial effect that a processing of information assets may depend on the high-level classes to which the respective information assets are assigned. For example, two information assets may each per se comprise information based on which no individual persons may be identified, or which cannot be related to individual persons. However, in combination the information provided by the two information assets may allow to identify individual persons or may be related to individual persons. For example, the two information assets may be stored at different (e.g., independent) storage location to reduce the risk that individual persons can be identified in case a storage location is compromised.

For example, the access rights may define one or more of the following permissions: read permission, change permission, write permission, delete permission. The definition of access rights may have the beneficial effect that embodiments of the present invention can grant access rights for information assets based on high-level classes to which the respective information assets are assigned.

For example, the types of information assets identified by the information asset type identifiers may comprise one more of the following: data field, column, table, schema, database, machine, cluster. For example, the types of information assets identified by the information asset type identifiers may comprise files and/or folders. A folder, also be referred to as a directory, comprise a set of subordinate folders and/or a set of files. Folders allow to group files into separate collections. The directories may be organized in form of a directory structure, such as hierarchical tree structure of directories and files of a file system.

For example, the high-level classes may comprise one or more of the following classes: personally identifiable information, personally identifiable information in public domain, sensitive personally identifiable information, highly sensitive personally identifiable information.

In example embodiments, implementations of the method described herein may provide a notion of information assets ordered by a containment hierarchy. Low-level classes (e.g., such as business terms and/or data specific classes) may be provided for classifying information assets. For example, the low-level classes may at least be used to classify information assets at a low hierarchical level of the containment hierarchy (e.g., information assets comprise no or only few other types of information assets). In further example embodiments, implementations of the method described herein may provide a notion of HLCs used for classifying information assets, such as PII and SPII (e.g., inspired by regulations).

In additional example embodiments, implementations of the method described herein may provide a mechanism of extensible automation rules that may assign information assets to HLCs based on low-level classes and other information associated with the respective information assets, which may propagate HLC assignments from subordinate information assets to superordinate information assets in the containment hierarchy, and that may automatically adapt HLC assignments to changes of the low-level assignments and other information.

For example, the computer program product further comprises machine-executable program instructions configured to implement any of the embodiments of the method for governing a set of information assets using an information governance system described herein. For example, the computer system further is configured to execute any of the embodiments of the method for governing a set of information assets using an information governance system described herein.

FIG. 1 depicts an exemplary computer system 100 configured for governing a set of information assets using an information governance system, in accordance with embodiments of the present invention. It will be appreciated that the computer system 100 described herein may be any type of computerized system comprising a plurality of plurality of processor chips, a plurality of memory buffer chips and a memory. The computer system 100 may for example be implemented in form of a general-purpose digital computer, such as a personal computer, a workstation, or a minicomputer.

In exemplary embodiments, in terms of hardware architecture, as shown in FIG. 1, the computer system 100 includes a processor 105, memory (main memory) 110 coupled to a memory controller 115, and one or more input and/or output (I/O) devices 10 (or peripherals), 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer system 100, a semiconductor-based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which comprises an ordered listing of executable instructions for implementing logical functions, notably functions involved in embodiments of this invention. The executable instructions may further be configured for governing a set of information assets using an information governance system. For example, the executable instructions may be configured to generate and/or apply HLC assignments rules and HLC propagation rules. The software in memory 110 may further include a suitable operating system (OS) 111. The OS 111 essentially controls the execution of other computer programs, such as possibly software 112.

If the computer system 100 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer system 100 is activated.

When the computer system 100 is in operation, the processor 105 is configured for executing software 112 stored within the memory 110, to communicate data to and from the memory 110, and to generally control operations of the computer system 100 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage. The information assets governed using the information governing system may be stored on the computer system 100 using an internal storage, like storage 120, or a peripheral storage, like storage medium 145. Alternatively, or additionally, information assets may be stored on other computer system, (e.g., such as server 200), accessible for the computer system 100 via a network (e.g., such as network 210). Alternatively, or additionally, definitions of the information assets and their identifiers as well as their assignments may be stored on or accessible for the computer system 100.

For example, a conventional keyboard 150 and mouse 155 can be coupled to the input/output controller 135. Other output devices such as the I/O devices 10 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The computer system 100 can further include a display controller 125 coupled to a display 130. For example, the computer system 100 can further include a network interface for coupling to a network 210, such as an intranet or the Internet. The network can be an IP-based network for communication between the computer system 100 and any external server, such as server 200, other client and the like via a broadband connection. The network 210 transmits and receives data between the computer system 100 and server 200. For example, network 210 may be a managed IP network administered by a service provider. The network 210 may be implemented in a wireless fashion, e.g., using wireless protocols and technologies, such as Wi-Fi, WiMAX, etc. The network 210 may also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

Figure 2:
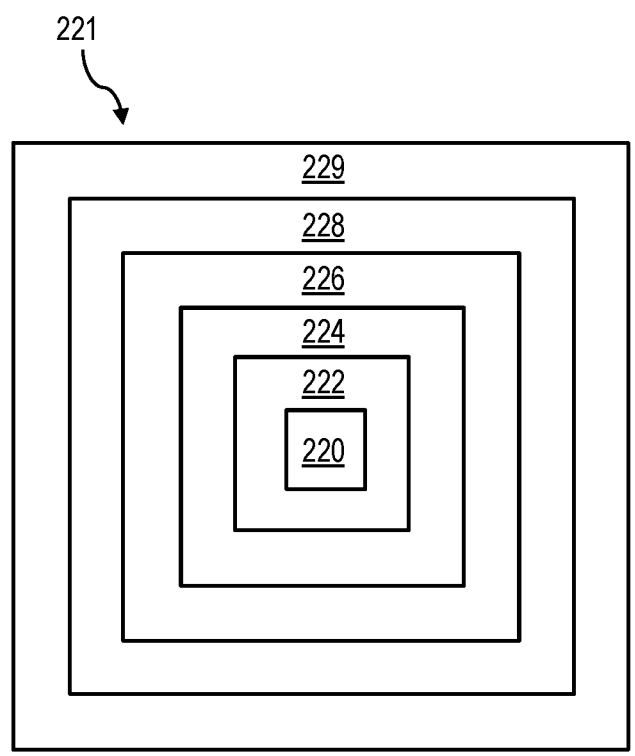
FIG. 2 depicts a schematic diagram illustrating an exemplary set of information assets, in accordance with embodiments of the present invention.

FIG. 2 depicts an exemplary set of information assets 221, in accordance with embodiments of the present invention. The information assets may be organized to form a containment hierarchy. For example, columns 220 may be comprised by a table 222. Tables 222 may be comprised by a schema 224. Schemas 224 may be comprised by a database 226. Databases 226 may be comprised by a machine 228. Machines 228 may be comprised by a cluster 229. For example, all the information assets on all hierarchical levels may be provided with information asset type identifiers identifying the information asset type of the respective information assets. For example, the information assets on the lowest hierarchical level (e.g., the columns) may be assigned with low-level classification assignments.

Figure 3:
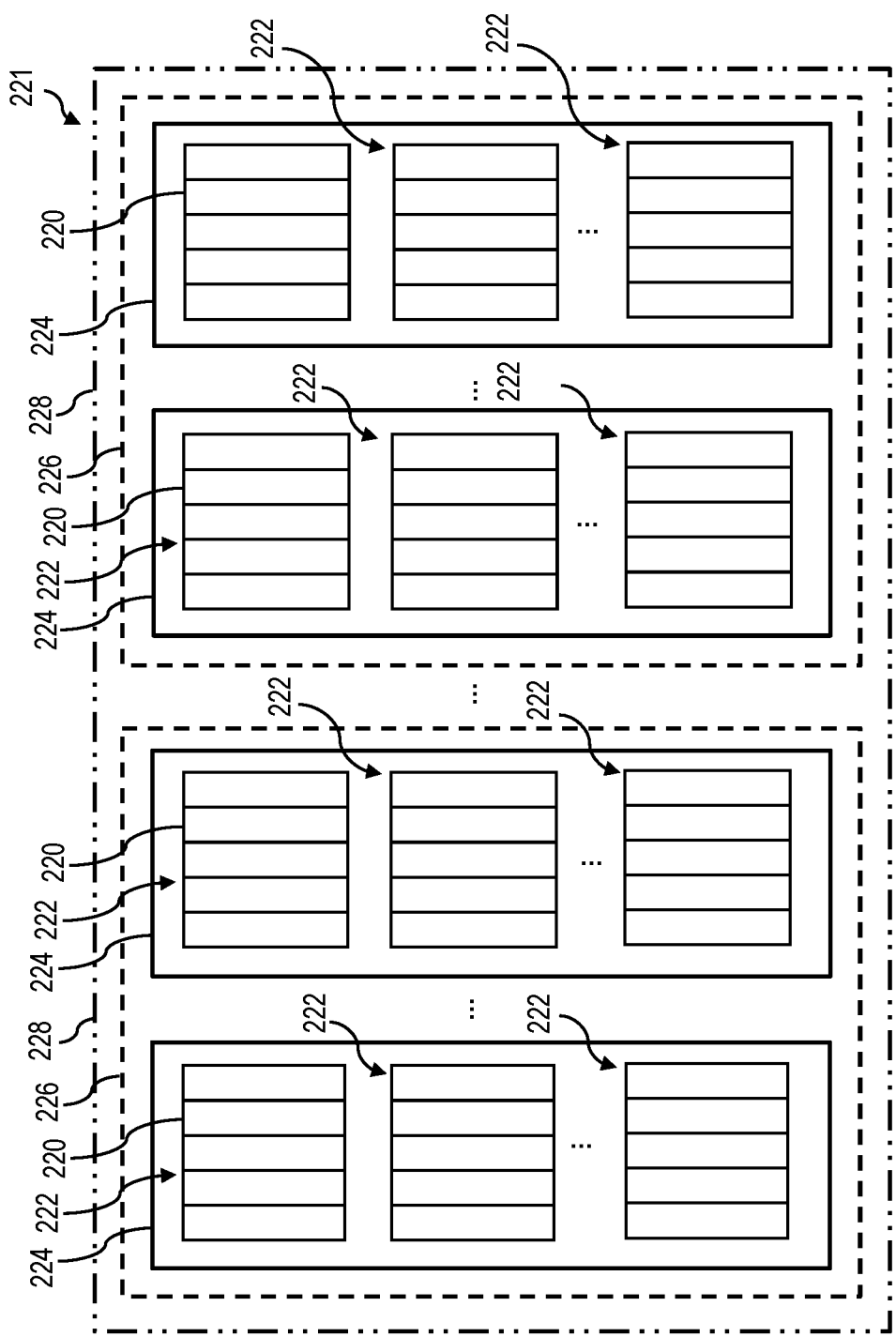
FIG. 3 depicts a schematic diagram illustrating an exemplary set of information assets, in accordance with embodiments of the present invention.

FIG. 3 depicts an exemplary set of information assets 221, in accordance with embodiments of the present invention. A plurality of columns 220 may be provided. The columns 220 may be grouped forming tables 222. The tables 222 may be grouped forming schemas 224. The schemas 224 may be grouped forming databases 226. In example embodiments, a plurality of databases 226 may be hosted on a machine 228. In further examples, the machines 228 may be grouped to form a cluster 229.

Figure 4:
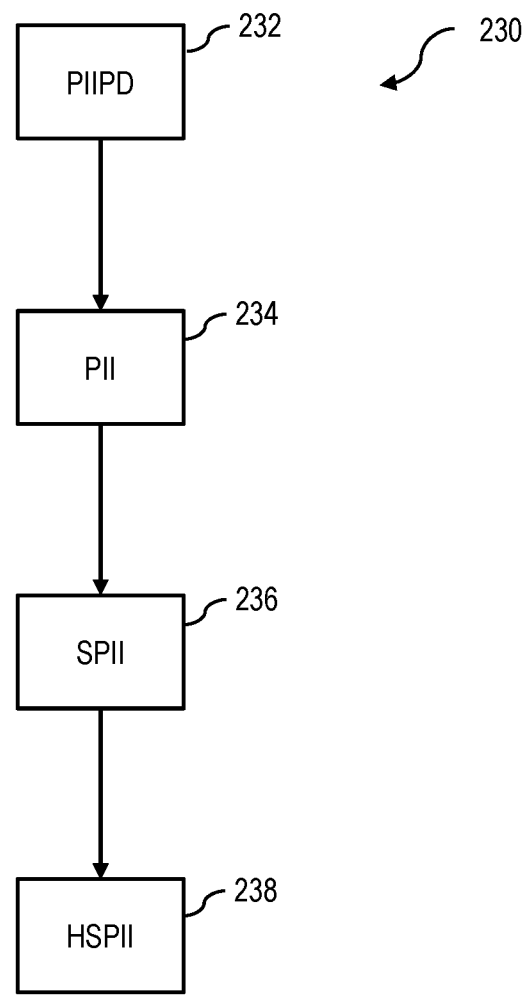
FIG. 4 depicts a schematic diagram illustrating an exemplary set of high-level classes, in accordance with embodiments of the present invention.

FIG. 4 depicts an exemplary set of high-level classes 230, in accordance with embodiments of the present invention. In example embodiments, the high-level classes of the set of high-level classes 230 may comprise a class 232 with personally identifiable information in public domain "PIIPD", a class 234 with personally identifiable information "PII", a class 236 with sensitive personally identifiable information "SPII", and a class 238 with highly sensitive personally identifiable information "HSPII". In an example embodiment, the set of high-level classes 230 is organized hierarchically. The arrows denote the order of the high-level classes.

In case of the exemplary types of classes depicted in FIG. 4, the arrows may indicate "requires more attention" (i.e., PII data requires more attention than PIIPD). For example, HLC assignments may be propagated recursively level-by-level through the hierarchy of the information assets (e.g., from the level of columns to the level of tables and subsequently to the levels of schemas, databases, host machines and beyond). For each information asset a high-level class may be determined based on the high-level classes to which the subordinate information assets comprised by the respective information assets are assigned using the hierarchical structure of the set of high-level classes 230. For example, the last high-level class in the direction of the arrows (i.e., the one requiring most attention), to which one of the subordinate information assets is assigned may be selected. However, also more complex relationships between high-level classes may be taken into account (e.g., organizing the high-level classes in a complete lattice).

Figure 5:
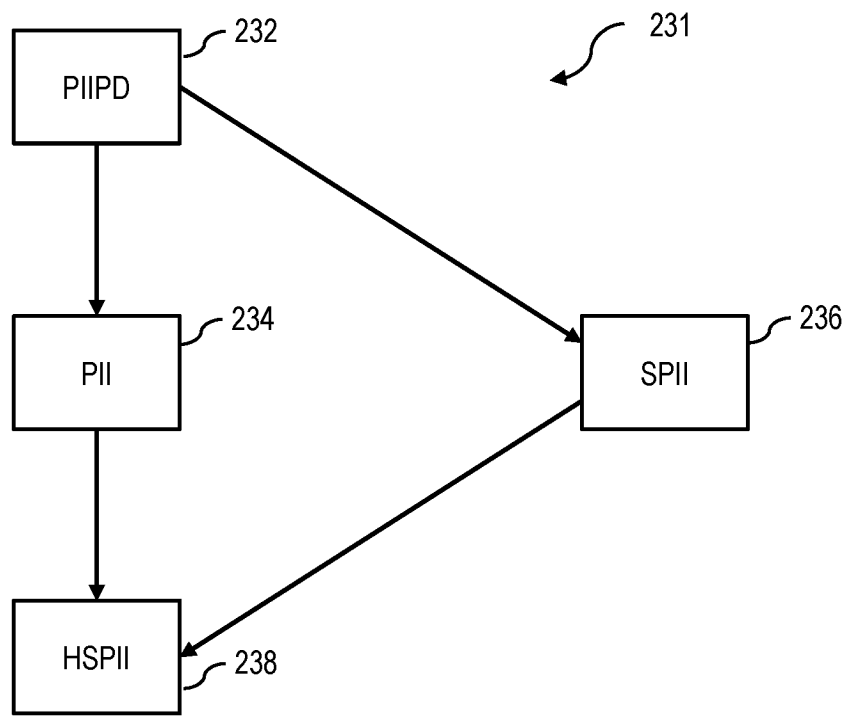
FIG. 5 depicts a schematic diagram illustrating an exemplary set of high-level classes, in accordance with embodiments of the present invention.

FIG. 5 depicts an exemplary set of high-level classes 231 organized in a lattice, in accordance with embodiments of the present invention. In example embodiments, the high-level classes of the set of high-level classes 231 may comprise a class 232 with personally identifiable information in public domain "PIIPD", a class 234 with personally identifiable information "PII", a class 236 with sensitive personally identifiable information "SPII", and a class 238 with highly sensitive personally identifiable information "HSPII". The high-level classes of the set of high-level classes 231 form a lattice. A lattice refers to a mathematical structure of a set elements with two elements always having a unique least upper bound, also referred to as a supremum, and a unique greatest lower bound, also referred to as an infimum. A special case of a lattice is a so-called complete lattice in which all subsets of elements have a unique supremum and infimum.

Using the lattice structure of the set of high-level classes 231 may enable a direct determination of HLC assignments. Using the lattice, the HLC assignments of information assets (e.g., such as columns, tables, etc.) may be taken and a most applicable HLC assignment may be determined in one step. If the HLC assignments are organized as a complete lattice, then the HLC assignment of an information asset (e.g., a database), may be the supremum of all the HLC assignments of all the corresponding children (i.e., of all the information assets, such as schemas, tables, columns), comprised by the respective information asset to be provided with a HLC assignment.

Considering the lattice structure of the set of high-level classes 231 depicted in FIG. 5, the arrows denote the order of the high-level classes. In case of the exemplary types of classes depicted in FIG. 5, the arrows may indicate "requires more attention" (i.e., PII data requires more attention than PIIPD). To find the supremum of a subset of N elements a unique element which is reachable from all N elements is determined (i.e., the upper bound), and which is not reachable from any other upper bound (i.e., the least upper bound).

For example, the supremum of "PIIPD" and "PII" according to the lattice structure shown in FIG. 5 is "PII", the supremum of "PIIPD" and "SPII" is "SPII", the supremum "PII" and "SPII" is "HSPII", the supremum of "PII", "SPII", "HSPII", and "PIIPD" is "HSPII". "HSPII" is an upper bound of "PII" and "PIIPD", but not the least, since "PII" is on a lower level of the order.

Figure 6:
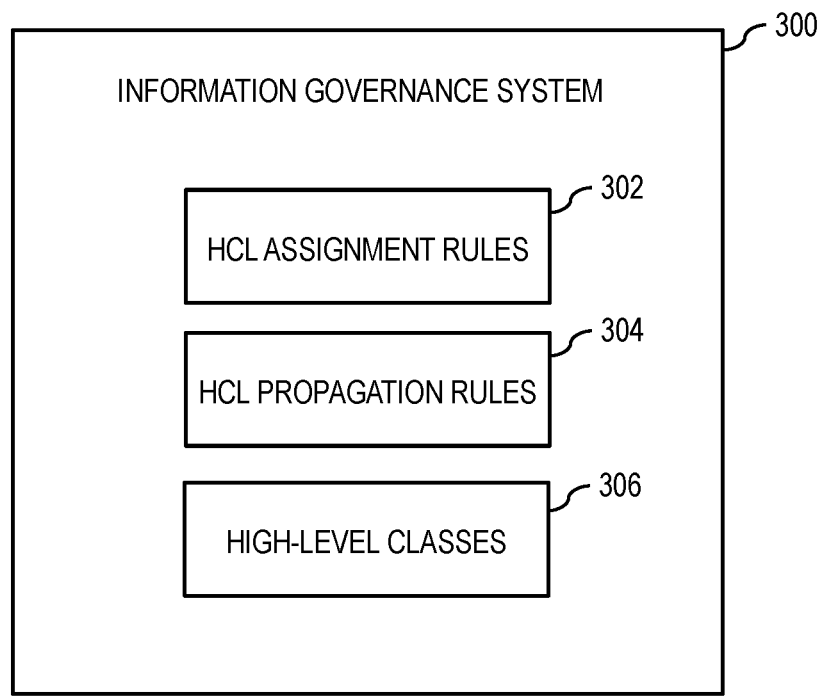
FIG. 6 depicts a schematic diagram illustrating an exemplary information governance system, in accordance with embodiments of the present invention.

FIG. 6 depicts an exemplary information governance system 300, in accordance with embodiments of the present invention. The information governance system 300 may comprise a set of high-level classes 306, a set of HLC assignment rules 302, and a set of HLC propagation rules. The set of high-level classes 306 may comprise a plurality of high-level classes. For example, the set of high-level classes 306 may be an at least partially ordered set of high-level classes. For example, the high-level classes of the set of high-level classes 306 may be hierarchically ordered. For example, the high-level classes of the set of high-level classes 306 may form a containment hierarchy. For example, the high-level classes of the set of high-level classes 306 may form a lattice (e.g., a complete lattice). The HLC assignment rules of the set of HLC assignment rules 302 may be configured for assigning information assets to the high-level classes of the set of high-level classes 306. The HLC assignment rules 302 may assign an information asset to a high-level class of the set of high-level classes based on an information asset type identifier identifying the information asset type of the respective information asset (e.g., column, etc.).

Furthermore, HLC assignment rules 302 may use low-level classification assignments of the respective information assets to provide HLC assignments. The HLC propagation rules of the set of HLC propagation rules 304 be configured for propagating HLC assignments of information assets of superordinate information assets provided with HLC assignments to one or more superordinate information assets comprising the respective superordinate information assets. For identifying a hierarchical level of a hierarchy of the to which the respective subordinate and superordinate information assets are assigned, information asset type identifiers may be used. For example, the HLC assignment rules may be used to provide HLC assignments for information assets at a lowest hierarchical level of a hierarchical set of information assets. The HLC propagation rules may be used to provide HLC assignments to information assets at higher levels of a hierarchical set of information assets (i.e., to propagate lower level HLC assignments, such as the HLC assignments provided using the HLC assignment rules, to higher levels of a hierarchical set of information assets).

Figure 7:
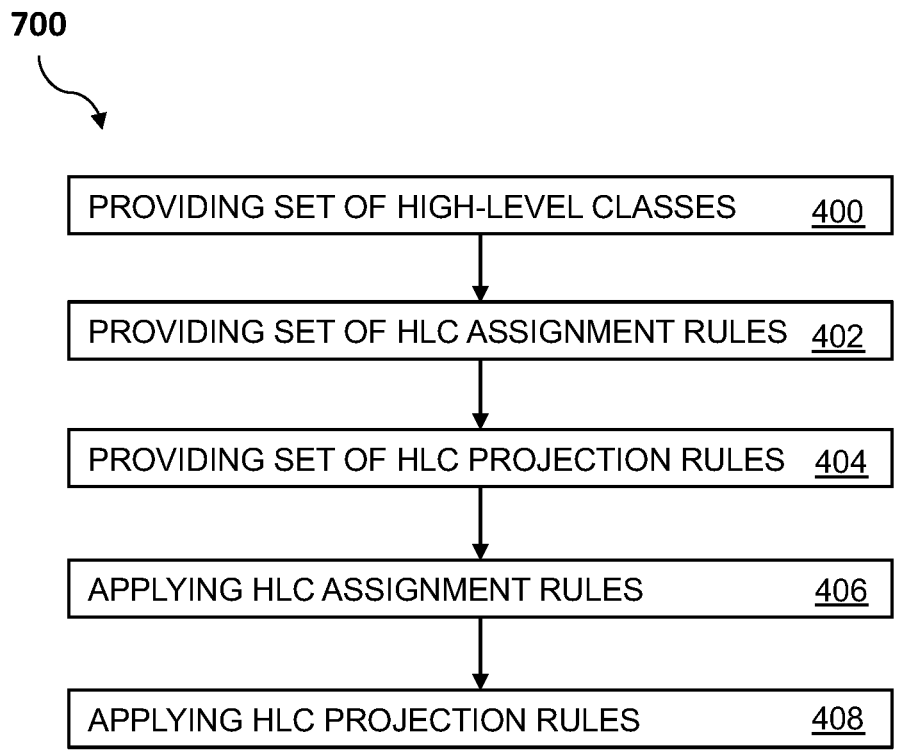
FIG. 7 depicts a schematic flow diagram of an exemplary method for governing a set of information assets, in accordance with embodiments of the present invention.

FIG. 7 depicts a schematic flow diagram of an exemplary method, method 700, for governing a set of information assets, in accordance with embodiments of the present invention. In various embodiments, an information governance system (e.g., information governance system 300 operating on or in conjunction with a computing system, such as computer system 100) can execute processing steps of method 700, accordance with embodiments of the present invention.

In example embodiments, the set of information assets is an at least partially ordered set, which forms a containment hierarchy. The information assets are provided with information asset type identifiers. Furthermore, at least some of the information assets are provided with low-level classification assignments to low-level classes. For example, at least information assets on the lowest hierarchical level of the containment hierarchy may be assigned with low-level classification assignments. For example, only the information assets on the lowest hierarchical level of the containment hierarchy may be assigned with low-level classification assignments.

In block 400 of method 700, the information governance system may provide a set of high-level classes. In block 402 of method 700, the information governance system may provide a set of HLC assignment rules. The HLC assignment rules may be configured for assigning the information assets of the set of information assets to the high-level classes of the set of high-level classes using the information asset type identifiers and the low-level classification assignments of the respective information assets. In block 404 of method 700, the information governance system may provide a set of one or more HLC propagation rules. The HLC rules may be configured for propagating HLC assignments of subordinate information assets to superordinate information assets comprising the respective subordinate information assets.

In block 406 of method 700, the information governance system may apply the HLC assignment rules to information assets. For example, information governance system applies the HLC assignment rules to information assets at a lowest hierarchical level of the containment hierarchy of the information assets. Information asset type identifiers and low-level classification assignments of the respective information assets may be used as input to provide HLC assignments for the respective information assets to high-level classes of the set of high-level classes as output.

In block 408 of method 700, the information governance system may apply the HLC propagation rules to information assets. In example embodiments, the information governance system applies the HLC propagation rules to information assets provided with the high-level classification assignments in order to propagate the HLC assignments of the respective information assets upwards within the containment hierarchy of the information assets. For example, the information governance system can propagate the HLC assignments of the respective information assets to one or more superordinate information assets.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Possible combinations of features described above may be the following:

1. A method for governing a set of information assets using an information governance system, the set of information assets being an at least partially ordered set forming a first containment hierarchy, the information assets being provided with information asset type identifiers and at least some of the information assets being provided with low-level classification assignments to low-level classes, the method comprising using the information governance system for:

providing a set of high-level classes,
providing a set of high-level classification assignment rules for assigning the information assets of the set of information assets to the high-level classes of the set of high-level classes using the information asset type identifiers and the low-level classification assignments of the respective information assets, providing a set of one or more high-level classification propagation rules for propagating the high-level classification assignments of one or more information assets of the set of information assets, which are subordinate to one or more superordinate information assets of the set of information assets, to the one or more superordinate information assets, applying one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the high-level classes of the set of high-level classes as output, applying one or more high-level classification propagation rules of the set of high-level classification assignment rules to the one or more information assets of the set of information assets provided with the high-level classification assignments for propagating the respective high-level classification assignments upwards within the first containment hierarchy to one or more superordinate information assets of the set of information assets.

2. The method of item 1, wherein the applying of the one or more high-level classification propagation rules is performed recursively hierarchical level by hierarchical level upwards through the first containment hierarchy.

3. The method of any of the previous items, wherein the applying of the one or more high-level propagation rules comprises applying the one or more high-level propagation rules to all information assets of the set of information assets which are at a same hierarchical level within the first containment hierarchy and which share a common superordinate information asset of the set of information assets.

4. The method of any of the previous items, wherein the set of high-level classes comprises one or more default high-level classes.

5. The method of any of the previous items, wherein the providing of the set of high-level classes comprises receiving one or more customized high-level classes.

6. The method of any of the previous items, wherein the set of high-level classification assignment rules comprises one or more default high-level classification assignment rules.

7. The method of any of the previous items, wherein the providing of the set of high-level classification assignment rules comprises receiving one or more customized high-level classification assignment rules.

8. The method of any of the previous items, wherein the set of high-level classes is an at least partially ordered set of high-level classes with at least some of the high-level classes comprising a hierarchical relationship to each other.

9. The method of item 8, wherein the at least partially ordered set of high-level classes forms a second containment hierarchy.

10. The method of any of items 8 and 9, wherein the partially ordered set of high-level classes forms a complete lattice with each subset of the set having a supremum.

11. The method of item 10, wherein the providing of the set of high-level classification propagation rules comprises using an ordering of the high-level classes within the complete lattice for determining one or more high-level classification propagation rules of the set of high-level classification propagation rules.

12. The method of any of items 8 to 11, wherein the high-level classification propagation rules are applied to a plurality of information assets of different hierarchical levels using a single supremum-based operation.

13. The method any of the previous items, wherein the set of high-level classification propagation rules comprises receiving one or more user-defined high-level classification assignment rules.

14. The method any of the previous items, wherein the applying of the one or more high-level classification assignment rules and the applying of the one or more high-level classification propagation rules is performed upon detecting a triggering event.

15. The method of item 14, wherein the triggering event is one of the following: adding an information asset to the set of information assets, amending an information asset of the set of information assets, deleting an information asset from the set of information assets.

16. The method of any of the previous items, wherein processing of the information assets is restricted based high-level classification assignments of the respective information assets, wherein the processing comprises one or more of the following: storing, archiving, deleting and accessing.

17. The method of any of the previous items, wherein the types of information assets identified by the information asset type identifiers comprising one more of the following: data field, column, table, schema, database, machine, cluster.

18. The method of any of the previous items, wherein the high-level classes comprise one or more of the following classes: personally identifiable information, personally identifiable information in public domain, sensitive personally identifiable information, highly sensitive personally identifiable information.

19. A computer program product comprising a non-volatile computer-readable storage medium having machine-executable program instructions embodied therewith for governing a set of information assets using an information governance system, the set of information assets being an at least partially ordered set forming a containment hierarchy, the information assets being provided with information asset type identifiers and at least some of the information assets being provided with low-level classification assignments to low-level classes, execution of the program instructions by a processor of a computer system causing the processor to control the computer system to use the information governance system for:

providing a set of high-level classes, providing a set of high-level classification assignment rules for assigning the information assets of the set of information assets to the high-level classes of the set of high-level classes using the information asset type identifiers and the low-level classification assignments of the respective information assets, providing a set of one or more high-level classification propagation rules for propagating the high-level classification assignments of one or more information assets of the set of information assets, which are subordinate to one or more superordinate information assets of the set of information assets, to the one or more superordinate information assets, applying one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the high-level classes of the set of high-level classes as output, applying one or more high-level classification propagation rules of the set of high-level classification assignment rules to the one or more information assets of the set of information assets provided with the high-level classification assignments for propagating the respective high-level classification assignments upwards within the containment hierarchy to one or more superordinate information assets of the set of information assets.

20. A computer system for governing a set of information assets using an information governance system, the set of information assets being an at least partially ordered set forming a containment hierarchy, the information assets being provided with information asset type identifiers and at least some of the information assets being provided with low-level classification assignments to low-level classes, the computer system comprising a processor and a memory storing machine-executable program instructions, execution of the program instructions by the processor causing the processor to control the computer system to use the information governance system for:

providing a set of high-level classes, providing a set of high-level classification assignment rules for assigning the information assets of the set of information assets to the high-level classes of the set of high-level classes using the information asset type identifiers and the low-level classification assignments of the respective information assets, providing a set of one or more high-level classification propagation rules for propagating the high-level classification assignments of one or more information assets of the set of information assets, which are subordinate to one or more superordinate information assets of the set of information assets, to the one or more superordinate information assets, applying one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the high-level classes of the set of high-level classes as output, applying one or more high-level classification propagation rules of the set of high-level classification assignment rules to the one or more information assets of the set of information assets provided with the high-level classification assignments for propagating the respective high-level classification assignments upwards within the containment hierarchy to one or more superordinate information assets of the set of information assets.

What is claimed is:

1. A method for governing a set of information assets, the method comprising:

identifying, by one or more processors, a set of information assets being an at least partially ordered set forming a first containment hierarchy, information assets of the set of information assets being provided with information asset type identifiers and at least some of the information assets being provided with low-level classification assignments to low-level classes;

determining, by one or more processors, a set of high-level classes comprising one or more default high-level classes;

determining, by one or more processors, a set of high-level classification assignment rules for assigning the information assets of the set of information assets to the one or more default high-level classes of the set of high-level classes using the information asset type identifiers and the low-level classification assignments of the respective information assets;

determining, by one or more processors, a set of one or more high-level classification propagation rules for propagating the high-level classification assignments of one or more information assets of the set of information assets, which are subordinate to one or more superordinate information assets of the set of information assets, to the one or more superordinate information assets; and applying, by one or more processes, one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the one or more default high-level classes of the set of high-level classes as output, wherein the one or more high-level classification assignment rules assign the one or more information assets to the one or more default high-level classes based on the information asset type identifiers and the low-level classification assignments.

2. The method of claim 1, further comprising:

applying, by one or more processors, one or more high-level classification propagation rules of the set of high-level classification assignment rules to the one or more information assets of the set of information assets provided with the high-level classification assignments for propagating the respective high-level classification assignments upwards within the first containment hierarchy to one or more superordinate information assets of the set of information assets.

3. The method of claim 2, wherein the applying of the one or more high-level classification propagation rules is performed recursively hierarchical level by hierarchical level upwards through the first containment hierarchy.

4. The method of claim 2, wherein the applying of the one or more high-level propagation rules further comprises:

applying, by one or more processors, the one or more high-level propagation rules to all information assets of the set of information assets which are at a same hierarchical level within the first containment hierarchy and which share a common superordinate information asset of the set of information assets.

5. The method of claim 1, wherein determining the set of high-level classes further comprises:

receiving, by one or more processors, one or more customized high-level classes.

6. The method of claim 1, wherein the set of high-level classification assignment rules comprises one or more default high-level classification assignment rules.

7. The method of claim 1, wherein determining the set of high-level classification assignment rules further comprises:
receiving, by one or more processors, one or more customized high-level classification assignment rules.

8. The method of claim 1, wherein the set of high-level classes is an at least partially ordered set of high-level classes with at least some of the high-level classes comprising a hierarchical relationship to each other.

9. The method of claim 8, wherein the at least partially ordered set of high-level classes forms a second containment hierarchy.

10. The method of claim 8, wherein the at least partially ordered set of high-level classes forms a complete lattice with each subset of the set having a supremum.

11. The method of claim 10, wherein determining the set of high-level classification propagation rules utilizes an ordering of the set of high-level classes within the complete lattice for determining one or more high-level classification propagation rules of the set of high-level classification propagation rules.

12. The method of claim 10, further comprising:
applying, by one or more processors, the high-level classification propagation rules to a plurality of information assets of different hierarchical levels using a single supremum-based operation.

13. The method of claim 1, wherein the applying of the one or more high-level classification assignment rules and the applying of the one or more high-level classification propagation rules is performed in response to detecting a triggering event.

14. The method of claim 13, wherein the triggering event is an event selected from the group consisting of adding an information asset to the set of information assets, amending an information asset of the set of information assets, and deleting an information asset from the set of information assets.

15. The method of claim 1, wherein processing of the information assets is restricted based high-level classification assignments of the respective information assets, and wherein the processing comprises an action selected from the group consisting of storing, archiving, deleting, and accessing.

16. The method of claim 1, wherein the types of information assets identified by the information asset type identifiers selected from the group consisting of: data field, column, table, schema, database, machine, cluster.

17. The method of claim 1, wherein the set of high-level classes comprises one or more classes selected from the group consisting of personally identifiable information, personally identifiable information in public domain, sensitive personally identifiable information, and highly sensitive personally identifiable information.

18. A computer program product for governing a set of information assets, the computer program product comprising:
one or more computer readable storage media and program instructions stored on the one or more computer readable storage media, the program instructions comprising:
program instructions to identify a set of information assets being an at least partially ordered set forming a first containment hierarchy, information assets of the set of information assets being provided with information asset type identifiers and at least some of the information assets being provided with low-level classification assignments to low-level classes;
program instructions to determine a set of high-level classes comprising one or more default high-level classes;
program instructions to determine a set of high-level classification assignment rules for assigning the information assets of the set of information assets to the one or more default high-level classes of the set of high-level classes using the information asset type identifiers and the low-level classification assignments of the respective information assets;
program instructions to determine a set of one or more high-level classification propagation rules for propagating the high-level classification assignments of one or more information assets of the set of information assets, which are subordinate to one or more superordinate information assets of the set of information assets, to the one or more superordinate information assets; and
program instructions to apply one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the one or more default high-level classes of the set of high-level classes as output, wherein the one or more high-level classification assignment rules assign the one or more information assets to the one or more default high-level classes based on the information asset type identifiers and the low-level classification assignments.

19. A computer system for governing a set of information assets, the computer system comprising:
one or more computer processors;
one or more computer readable storage media; and
program instructions stored on the computer readable storage media for execution by at least one of the one or more processors, the program instructions comprising:
program instructions to program instructions to identify a set of information assets being an at least partially ordered set forming a first containment hierarchy, information assets of the set of information assets being provided with information asset type identifiers and at least some of the information assets being provided with low-level classification assignments to low-level classes;
program instructions to determine a set of high-level classes comprising one or more default high-level classes;
program instructions to determine a set of high-level classification assignment rules for assigning the information assets of the set of information assets to the one or more default high-level classes of the set of high-level classes using the information asset type identifiers and the low-level classification assignments of the respective information assets;
program instructions to determine a set of one or more high-level classification propagation rules for propagating the high-level classification assignments of one or more information assets of the set of information assets, which are subordinate to one or more superordinate information assets of the set of information assets, to the one or more superordinate information assets; and program instructions to apply one or more high-level classification assignment rules of the set of high-level classification assignment rules to one or more information assets of the set of information assets using the information asset type identifiers and the low-level classification assignments of the respective one or more information assets as input to provide one or more high-level classification assignments of the respective one or more information assets to one or more of the one or more default high-level classes of the set of high-level classes as output, wherein the one or more high-level classification assignment rules assign the one or more information assets to the one or more default high-level classes based on the information asset type identifiers and the low-level classification assignments.

\* \* \* \* \*